United States Patent
Toda

(10) Patent No.: US 12,227,180 B2
(45) Date of Patent: Feb. 18, 2025

(54) DRIVING SUPPORT DEVICE, DRIVING SUPPORT METHOD, AND DRIVING SUPPORT PROGRAM

(71) Applicant: TOYOTA JIDOSHA KABUSHIKI KAISHA, Toyota (JP)

(72) Inventor: Yoshinari Toda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 17/974,052

(22) Filed: Oct. 26, 2022

(65) Prior Publication Data

US 2023/0148012 A1 May 11, 2023

(30) Foreign Application Priority Data

Nov. 10, 2021 (JP) ................................ 2021-183301

(51) Int. Cl.
| | |
|---|---|
| *B60W 30/14* | (2006.01) |
| *B60W 10/18* | (2012.01) |
| *B60W 30/18* | (2012.01) |
| *B60W 40/105* | (2012.01) |
| *G06V 10/56* | (2022.01) |
| *G06V 20/58* | (2022.01) |

(52) U.S. Cl.
CPC .......... *B60W 30/143* (2013.01); *B60W 10/18* (2013.01); *B60W 30/18154* (2013.01); *B60W 40/105* (2013.01); *G06V 10/56* (2022.01); *G06V 20/584* (2022.01); *B60W 2420/403* (2013.01); *B60W 2555/60* (2020.02)

(58) Field of Classification Search
None
See application file for complete search history.

(56) References Cited

U.S. PATENT DOCUMENTS

| | | | |
|---|---|---|---|
| 2018/0281802 A1 | 10/2018 | Oyama | |
| 2023/0175863 A1* | 6/2023 | Kitahara | ............ G01C 21/3885 |
| | | | 701/400 |

FOREIGN PATENT DOCUMENTS

| | | |
|---|---|---|
| JP | 2017-070133 A | 4/2017 |
| JP | 6552064 B2 | 7/2019 |

* cited by examiner

*Primary Examiner* — Hongye Liang
(74) *Attorney, Agent, or Firm* — Sughrue Mion, PLLC

(57) ABSTRACT

A driving support device acquires a signal color and controls a vehicle speed. The device controls the vehicle before a recognizable point such that a vehicle speed at a time at which the vehicle reaches the recognizable point is equal to or lower than a target value which is a lower speed than a target value. The recognizable point is a point at which a distance to the nearest traffic light positioned in front of the vehicle is a predetermined value. The device controls the vehicle such that, when a signal color of the traffic light is green, and a distance between the traffic light and a next traffic light is equal to or shorter than a predetermined threshold value, the vehicle travels at a constant speed equal to or lower than the target value until the signal color of the next traffic light is acquired.

6 Claims, 6 Drawing Sheets

DRIVING SUPPORT DEVICE, DRIVING SUPPORT METHOD, AND DRIVING SUPPORT PROGRAM

BACKGROUND OF THE INVENTION

1. Field of the Invention

The present invention relates to a driving support device which is mounted on a vehicle to control a speed of the vehicle, a driving support method, and a driving support program.

2. Description of the Related Art

Hitherto, there has been known a driving support device which is mounted on a vehicle to control a speed of the vehicle (own vehicle) (hereinafter referred to as "related-art device") (see, for example, Japanese Patent No. 6552064). Specifically, the related-art device includes a speed control device which controls, for example, an engine and brakes such that the speed of the own vehicle matches a predetermined first speed when there is no other vehicle (preceding vehicle) in front of the own vehicle. Further, the related-art device includes an image pickup device (camera) which photographs the foreground of the own vehicle and outputs obtained image data, and an image analysis device which analyzes the image data and determines (recognizes) a signal color of a traffic light in front of the own vehicle. The speed control device controls the speed of the own vehicle in accordance with the analysis result obtained by the image analysis device when the own vehicle passes through the traffic light.

When a traffic light enters the angle of view (field of view) of the image pickup device, the image analysis device attempts to determine the signal color of the traffic light. When the signal color of the traffic light is not determinable by the image analysis device at that time, the speed control device decelerates the own vehicle. The magnitude (absolute value) of the acceleration (negative value) at that time is relatively small. When the own vehicle approaches the traffic light and the image analysis device can determine the signal color of the traffic light, the speed control device controls the speed of the own vehicle in accordance with the determination result. Specifically, when the signal color of the traffic light is "yellow" or "red," the own vehicle is further decelerated and stopped before the traffic light. Meanwhile, when the signal color of the traffic light is "green," the speed control device causes the own vehicle to travel at a constant speed to pass through the traffic light.

There is assumed a case in which the own vehicle passes through a first traffic light, which is the nearest traffic light positioned in front of the own vehicle, and then a second traffic light, which is the traffic light next in front from the first traffic light. In this case, in the related-art device, when the signal color of the first traffic light is not determinable by the image analysis device at the time at which the first traffic light enters the angle of view of the image pickup device, the speed control device decelerates the own vehicle. Then, when the image analysis device determines that "the signal color of the first traffic light is 'green'," the speed control device causes the own vehicle to travel at a constant speed to pass through the first traffic light. When the second traffic light is not within the angle of view of the image pickup device at the time at which the own vehicle passes through the first traffic light, the speed control device accelerates the own vehicle. When the own vehicle advances, the second traffic light enters the angle of view of the image pickup device, and the signal color of the second traffic light is not determinable by the image analysis device at that time, the speed control device decelerates the own vehicle again. In this case, when the distance between the first traffic light and the second traffic light is relatively short, acceleration and deceleration of the own vehicle are repeated within a relatively short period of time, and hence there is a fear in that the occupants of the vehicle may feel uncomfortable.

SUMMARY OF THE INVENTION

One object of the present invention is to provide a driving support device capable of reducing discomfort of occupants of a vehicle.

In order to solve the above-mentioned problem, according to at least one embodiment of the present invention, there is provided a driving support device (1) which is mounted on an own vehicle (V). The driving support device includes: a speed control device (10) configured to control a drive device (20) and a braking device (30) of the own vehicle such that a speed of the own vehicle matches a predetermined first target value (Vd) when another vehicle is not present in front of the own vehicle; a signal color recognition device (53) configured to recognize a signal color of a traffic light (S1, S2) present in a predetermined area extending in front from the own vehicle; and a position detection device (55) configured to detect a position of the own vehicle and a position of the traffic light. The signal color of the traffic light is recognizable by the signal color recognition device when a distance to the traffic light positioned in front of the own vehicle is equal to or shorter than a first predetermined value (Lr). The speed control device is configured to: control the drive device and the braking device of the own vehicle before a first point (Pr1) such that a speed of the own vehicle at a time at which the own vehicle reaches the first point is equal to or lower than a second target value (V1) which is a lower speed than the predetermined first target value, the first point being a point at which a distance to a first traffic light (S1), which is the nearest traffic light positioned in front of the own vehicle, is the first predetermined value; and control the drive device and the braking device such that, when the signal color recognition device recognizes a signal color of the first traffic light, the signal color is green, and a distance (DS) between the first traffic light (S1) and a second traffic light (S2) next in front from the first traffic light is equal to or shorter than a predetermined threshold value (DSth), the own vehicle travels at a constant speed equal to or lower than the second target value until the signal color recognition device recognizes a signal color of the second traffic light.

When the signal color of the first traffic light is "green" and the distance between the first traffic light and the second traffic light is relatively short (equal to or shorter than a predetermined value), the speed control device of the driving support device according to the at least one embodiment of the present invention causes the own vehicle to travel at a constant speed (suppresses acceleration) until the signal color recognition device recognizes the signal color of the second traffic light. Therefore, it is possible to suppress the repetition of acceleration and deceleration when the interval between the first traffic light and the second traffic light is relatively short. As a result, according to the at least one embodiment of the present invention, the discomfort of the occupants of the vehicle can be reduced.

In the driving support device according to one aspect of the present invention, the speed control device is configured to decelerate the own vehicle at a predetermined acceleration from a predetermined point before the first point such that the speed of the own vehicle at the time at which the own vehicle reaches the first point matches the second target value.

In the driving support device according to the one aspect of the present invention, the speed control device is configured to calculate a distance (L0) for which the own vehicle travels until a vehicle speed matches the second target value (V1) when the own vehicle decelerates from a current vehicle speed (V0) at the predetermined acceleration (a1), and to determine a point positioned before the first point by the calculated distance as the predetermined point (Psd).

Further, in those cases, the predetermined acceleration may have a magnitude of 0.1 g (g: gravitational acceleration) or less.

In the above-mentioned related-art device, when it is recognized that a traffic light has entered the angle of view (frame) of the image pickup device, and the image analysis device starts determination of the signal color of the traffic light but the signal color is not determinable, the speed control device gradually decelerates the vehicle. Then, when the signal color of the traffic light is determinable by the image analysis device, the speed control device accelerates the vehicle, decelerates the vehicle, or causes the vehicle to travel at a constant speed in accordance with the signal color. Accordingly, for example, in a case in which the road has a large curve before the traffic light, when the traffic light enters the angle of view of the image pickup device after the distance between the vehicle and the traffic light becomes relatively short, the speed control device decelerates the vehicle at a relatively large acceleration in order to stop the vehicle.

In contrast, with the speed control device of the driving support device according to the aspects of the present invention, the vehicle is gently decelerated even before the own vehicle reaches the first point, regardless of the recognition result of the signal color recognition device. Therefore, even when the signal color can be recognized by the signal color recognition device at the time at which the distance between the own vehicle and the traffic light has become relatively short, the speed of the own vehicle is relatively low at that time. As a result, even when the signal color of the traffic light is "yellow" or "red" at that time, the speed control device can decelerate the own vehicle at a relatively small acceleration (acceleration which does not cause discomfort to the occupants) to stop the own vehicle before the traffic light.

DESCRIPTION OF THE EMBODIMENTS (Outline of Configuration)

Figure 1:
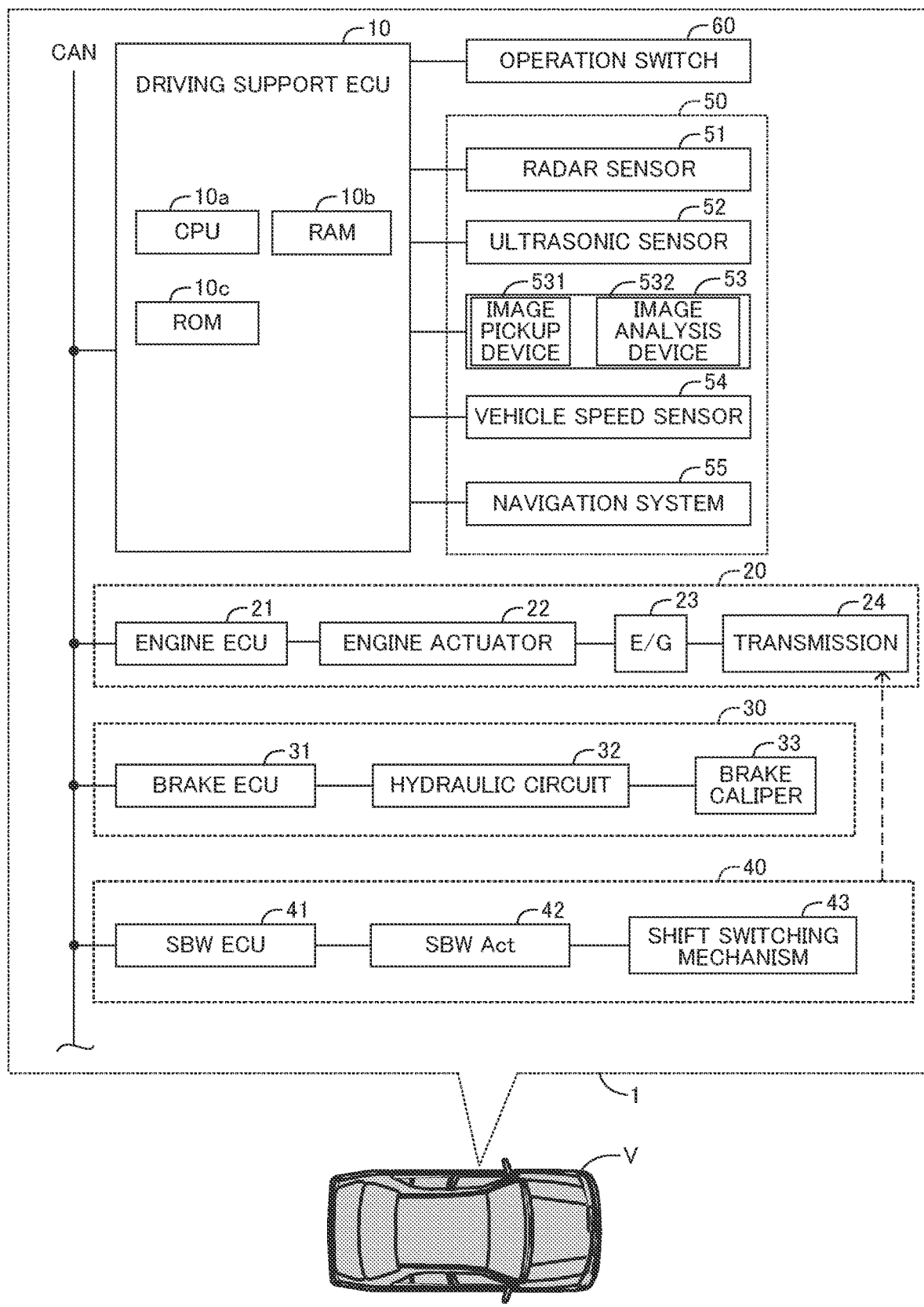
FIG. 1 is a block diagram of a driving support device according to at least one embodiment of the present invention.

As illustrated in FIG. 1, a driving support device 1 according to at least one embodiment of the present invention is mounted on a vehicle V. As described in detail later, the driving support device 1 controls an engine, brakes, and the like of the vehicle V such that the vehicle V travels at a constant speed or follows a preceding vehicle based on information acquired from sensors mounted on the vehicle V. The control is hereinafter referred to as "cruise control." The vehicle on which the driving support device 1 is mounted may be referred to as "own vehicle" in order to distinguish the vehicle from other vehicles.

(Specific Configuration)

As illustrated in FIG. 1, the driving support device 1 includes a driving support ECU 10, a drive device 20, a braking device 30, a shift switching device 40, ambient sensors 50, and an operation switch 60.

The driving support ECU 10 includes a microcomputer including, for example, a CPU 10a, a RAM 10b, and a ROM 10c. As used herein, "ECU" means an electronic control unit, and the ECU includes a microcomputer including, for example, a CPU, a RAM, and a ROM. The CPU implements various functions by executing instructions stored in the ROM.

The driving support ECU 10 is connected to other ECUs (engine ECU 21, brake ECU 31, and SBW ECU 41 described later) via a controller area network (CAN) in a manner that enables information to be transmitted and received to and from each other.

The drive device 20 generates a driving force, and applies the driving force to drive wheels out of wheels (left front wheel, right front wheel, left rear wheel, and right rear wheel). The drive device 20 includes, for example, an engine ECU 21, an engine actuator 22, an internal combustion engine 23, a transmission 24, and a driving force transmission mechanism (not shown) which transmits a driving force to the wheels. The engine ECU 21 is connected to the engine actuator 22. The engine actuator 22 includes a throttle valve actuator which changes an opening degree of a throttle valve of the internal combustion engine 23. The engine ECU 21 can change a torque generated by the internal combustion engine 23 by driving the engine actuator 22. The torque generated by the internal combustion engine 23 is transmitted to the drive wheels via the transmission 24 and the driving force transmission mechanism (for example, a drive shaft). As described above, the engine ECU 21 controls the driving force of the vehicle V by controlling the engine actuator 22.

When the vehicle V to which the driving support device 1 is applied is a hybrid electric vehicle (HEV) or a battery electric vehicle (BEV), the engine ECU 21 can control the driving force of the vehicle generated by any one or both of "an internal combustion engine and an electric motor" serving as a vehicle drive source.

The braking device 30 applies a braking force to the wheels. The braking device 30 includes a brake ECU 31, a hydraulic circuit 32, and a brake caliper 33. The hydraulic circuit 32 includes, for example, a reservoir, an oil pump, various valve devices, and a hydraulic sensor (which are not shown). The brake caliper 33 is a hydraulic actuator including a cylinder and a piston. When oil is supplied to the cylinder, the piston is pushed out of the cylinder. A brake pad is arranged at the tip of the piston, and the brake pad is pressed against a brake disc. The hydraulic circuit 32 adjusts the hydraulic pressure in the cylinder of the brake caliper 33 in response to a command from the brake ECU 31. As a result, the braking force of the wheel (brake disc) generated by the brake caliper 33 is controlled.

The shift switching device 40 switches a shift position of the transmission 24. The shift switching device 40 includes, for example, the shift-by-wire (SBW) ECU 41, an SBW actuator 42, and a shift switching mechanism 43. The SBW ECU 41 is connected to the SBW actuator 42. The SBW actuator 42 controls the shift switching mechanism 43 in response to a shift switching command from the SBW ECU 41 to switch the shift position of the transmission 24.

The ambient sensors 50 are configured to acquire vehicle peripheral information including information on three-dimensional objects present around the vehicle V and information on separation lines of a road surface around the vehicle V. The three-dimensional objects are, for example, moving objects, such as an automobile (another vehicle), a pedestrian, or a bicycle, and fixed objects, such as a guardrail or a traffic light.

The ambient sensors 50 include a radar sensor 51, an ultrasonic sensor 52, a camera 53, a vehicle speed sensor 54, and a navigation system 55.

The radar sensor 51 includes a radar transmitting/receiving unit and a signal processing unit (which are not shown). The radar transmitting/receiving unit radiates radio waves in the millimeter wave band (hereinafter referred to as "millimeter waves") into an area around the vehicle, and receives the millimeter waves reflected by a three-dimensional object present within a radiation range (that is, reflected waves).

The signal processing unit acquires information representing, for example, a distance between the vehicle V and the three-dimensional object, a relative speed between the vehicle V and the three-dimensional object, and a relative position (direction) of the three-dimensional object with respect to the vehicle V based on, for example, a phase difference between the transmitted millimeter waves and the received reflected waves, an attenuation level of the reflected waves, and a period of time from the transmission of the millimeter waves to the reception of the reflected waves, and outputs the acquired information to the driving support ECU 10.

The ultrasonic sensor 52 transmits ultrasonic waves in pulses into a predetermined range around the vehicle, and receives the reflected waves reflected by the three-dimensional object. The ultrasonic sensor 52 can detect, for example, a "reflection point, which is a point on the three-dimensional object from which the transmitted ultrasonic waves are reflected," and a "distance between the ultrasonic sensor and the three-dimensional object" based on the period of time from the transmission of the ultrasonic waves to the reception of the reflected waves.

The camera 53 includes an image pickup device 531 and an image analysis device 532. The image pickup device 531 is, for example, a digital camera having a built-in image pickup element being a charge-coupled device (CCD) or a CMOS image sensor (CIS). The image pickup device 531 is arranged on an upper part of a front windshield glass. The image pickup device 531 outputs image data obtained by photographing the foreground of the vehicle at a predetermined frame rate to the image analysis device 532. The image analysis device 532 analyzes the acquired image data, and acquires information on a target object positioned in front of the vehicle V from the image. The image analysis device 532 acquires (recognizes), for example, a signal color of a traffic light positioned in front of the vehicle V in a traveling direction thereof. In order for the image analysis device 532 to accurately determine whether or not an aggregate of pixels exhibiting a red circle in the image data is light emitted from a signal portion of the traffic light, it is required that the vehicle V be somewhat close to the traffic light. For example, when the vehicle V approaches the traffic light and a distance Lvs to the traffic light becomes "120 m," it becomes possible for the image analysis device 532 to accurately determine the signal color of the traffic light. In the following description, the maximum value of the distance Lvs (distance between the vehicle V and the traffic light) at which the image analysis device 532 can accurately determine the signal color of the traffic light is referred to as "recognizable distance Lr." Further, a point positioned before the traffic light by the recognizable distance Lr is referred to as "recognizable point Pr." The recognizable distance Lr depends on the specifications of the image pickup device 531. The recognizable distance Lr is experimentally calculated in the development stage of the vehicle V, and results of the experiment are stored in the ROM of the driving support ECU 10.

The vehicle speed sensor 54 includes a wheel speed sensor which generates one pulse signal (wheel pulse signal) each time the wheel of the own vehicle rotates by a predetermined angle. The vehicle speed sensor 54 measures the number of pulses of the wheel pulse signal transmitted from the wheel speed sensor in unit time, calculates a rotation speed (wheel speed) of each wheel based on the measured number of pulses, and calculates a vehicle speed Vs (actual vehicle speed) of the own vehicle based on the wheel speed of each wheel. The vehicle speed sensor 54 transmits data representing the vehicle speed Vs to the driving support ECU 10.

The navigation system 55 receives GPS signals from a plurality of satellites, and detects a current position PV (latitude and longitude) of the vehicle V based on the plurality of received GPS signals. Further, the navigation system 55 stores map data representing a map. The map data includes road information representing roads and traffic light position information indicating installation positions of traffic lights. The navigation system 55 transmits vehicle position data representing the detected current position PV to the driving support ECU 10. Moreover, the navigation system 55 has a function of calculating a distance between two points (distance along the road). For example, the navigation system 55 calculates the distance Lvs from the current position of the vehicle V to the traffic light (nearest traffic light) that the vehicle V is to pass first when traveling straight along the road on which the vehicle V is currently traveling, and transmits data on the distance to the driving support ECU 10.

The operation switch 60 is an operation element (for example, a push button type switch operation element) which is operated when a driver requests the start or end of cruise control. When the driver operates the operation switch 60 (when the driver presses the button) during a period in which cruise control is not being executed, the operation switch 60 transmits a cruise control start signal indicating that "the driver requests the start of cruise control (cruise control start request)" to the driving support ECU 10. Meanwhile, when the driver operates the operation switch 60 during a period in which cruise control is being executed, the operation switch 60 transmits a cruise control end signal indicating that "the driver requests the end of cruise control (cruise control end request)" to the driving support ECU 10.

Further, the operation switch 60 includes an operation element for designating a target value Dd of an inter-vehicle distance in cruise control and a target value Vd of the vehicle speed during constant speed traveling, which are described later.

(Cruise Control)

<Following Control>

When the driving support ECU 10 receives the cruise control start signal from the operation switch 60, the driving support ECU 10 executes cruise control (ACC). That is, the driving support ECU 10 determines, based on the information acquired from the ambient sensors 50, whether or not there is another vehicle (preceding vehicle) to be followed. When it is determined that a preceding vehicle to be followed is present, the driving support ECU 10 detects an inter-vehicle distance between the preceding vehicle and the vehicle V (own vehicle) based on the information acquired from the ambient sensors 50. Next, the driving support ECU 10 controls the drive device 20, the braking device 30, and the shift switching device 40 (hereinafter referred to as "drive device and the like") such that the inter-vehicle distance (actual measurement value) detected in the manner described above matches the target value Dd set in advance. However, when the signal color of the traffic light acquired from the camera 53 is "yellow" or "red," the driving support ECU 10 decelerates the vehicle V and stops the vehicle V before the traffic light even when the preceding vehicle does not start deceleration.

<Constant Speed Traveling Control>

Meanwhile, when it is determined that a preceding vehicle to be followed is not present, the driving support ECU 10 accelerates or decelerates the vehicle V at a predetermined acceleration a0 such that the vehicle speed Vs matches the target value Vd set in advance. Further, the driving support ECU 10 accelerates the vehicle V, decelerates the vehicle V, or causes the vehicle V to travel at a constant speed in accordance with the signal color of the traffic light. That is, when the signal color of the traffic light acquired from the camera 53 during travel of the vehicle V is "green," the driving support ECU 10 causes the vehicle V to travel as it is (accelerates the vehicle V or causes the vehicle V to travel at a constant speed) to pass through the traffic light. Meanwhile, when the signal color of the traffic light acquired from the camera 53 is "yellow" or "red," the driving support ECU 10 decelerates the vehicle V and stops the vehicle V before the traffic light. When the signal color of the traffic light becomes "green," the driving support ECU 10 accelerates the vehicle V and causes the vehicle V to pass through the traffic light. As used herein, "traveling at a constant speed (constant speed traveling)" means that the vehicle V travels at a constant speed.

Figure 2:
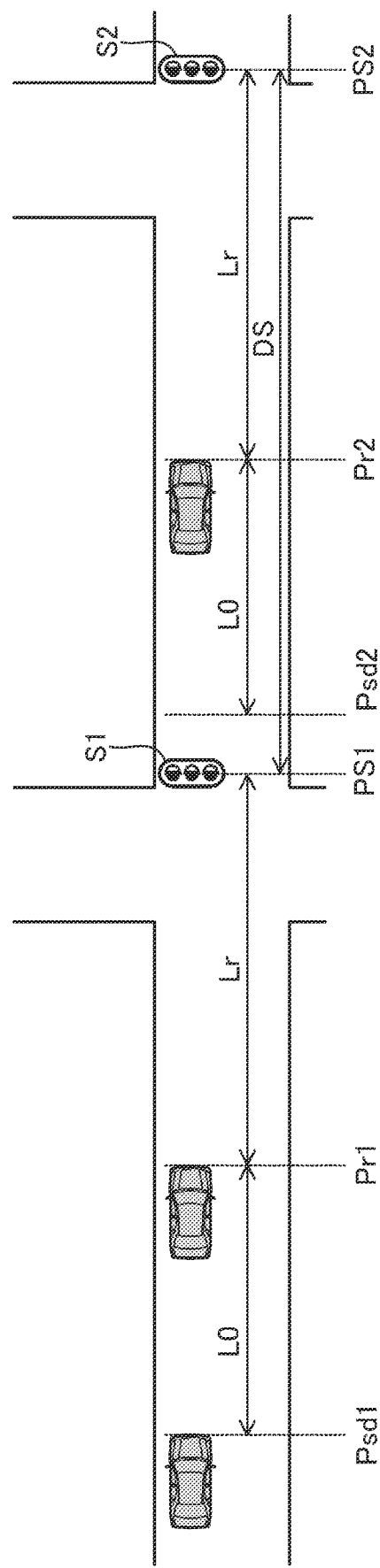
FIG. 2 is a plan view for illustrating an outline of constant speed traveling control.

Next, the constant speed traveling control is specifically described with reference to FIG. 2. When the driving support ECU 10 starts the constant speed traveling control, the driving support ECU 10 acquires from the navigation system 55 a point PS1 at which the nearest traffic light S1 positioned in front of the vehicle V is installed and a recognizable point Pr1 corresponding to the traffic light S1. Further, the driving support ECU 10 repeatedly acquires the current position PV of the vehicle V from the navigation system 55 at predetermined time intervals. Moreover, the driving support ECU 10 repeatedly acquires the vehicle speed Vs from the vehicle speed sensor 54 at predetermined time intervals.

The driving support ECU 10 controls the drive device and the like from before the recognizable point Pr1 such that the vehicle speed Vs is equal to or lower than a predetermined target value V1 at the time at which the vehicle V reaches the recognizable point Pr1. The target value V1 is defined in advance as a speed at which the vehicle V can be stopped before the traffic light S1 by decelerating the vehicle V from the recognizable point Pr1 at an acceleration a2 which does not cause discomfort to the driver.

Figure 3:
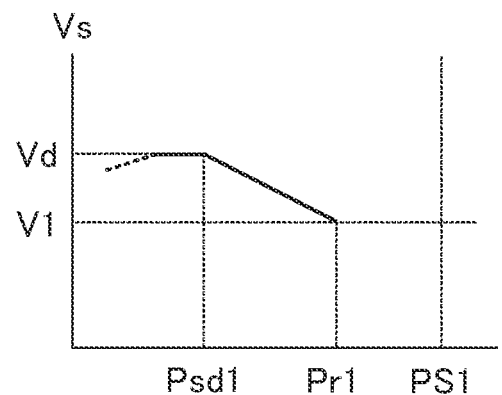
FIG. 3 is a graph for showing how a vehicle decelerates from a deceleration start point.

Specifically, as shown in FIG. 3, when the vehicle speed Vs before the recognizable point Pr1 is faster than the target value V1, the driving support ECU 10 decelerates the vehicle V at an acceleration a1 smaller than the acceleration a2 when the vehicle V arrives at a predetermined point (deceleration start point Psd1 described later). The magnitude (absolute value) of the acceleration a1 is a predetermined value A1. The predetermined value A1 is, for example, "0.1 g" (g: gravitational acceleration). The predetermined value A1 may be a value smaller than "0.1 g".

Figure 4:
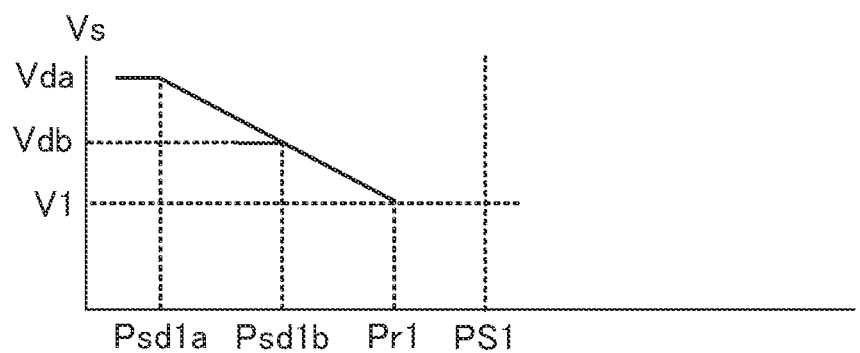
FIG. 4 is a graph for showing a relationship between a vehicle speed (initial speed V0) and the deceleration start point.

As described above, the absolute value of the acceleration a1 at the time of decelerating the vehicle V is set to be relatively small. Accordingly, as shown in FIG. 4, when the vehicle speed Vs before the recognizable point Pr1 (hereinafter also referred to as "initial speed V0") is a relatively high speed (Vda of FIG. 4), the driving support ECU 10 is required to start deceleration from a point at which the vehicle V is relatively far from the recognizable point Pr1 (Psd1a of FIG. 4). Meanwhile, when the initial speed V0 is slightly higher than the target value V1 (Vdb of FIG. 4), the driving support ECU 10 may start deceleration from a point relatively close to the recognizable point Pr1 (Psd1b of FIG. 4). The driving support ECU 10 calculates the point at which deceleration is to start before the traffic light S1 (deceleration start point Psd1) as follows.

First, the driving support ECU 10 calculates, when the vehicle speed is decelerated from a current vehicle speed Vs to the acceleration a1, a distance L0 (see FIG. 2) for which the vehicle V travels until the vehicle speed Vs matches the target value V1. Then, the driving support ECU 10 determines a point positioned before the recognizable point Pr1 by the distance L0 as the deceleration start point Psd1 corresponding to the current vehicle speed Vs. For example, in a situation in which the vehicle V is accelerated (or decelerated) in order to make the vehicle speed Vs match the target value Vd, the vehicle speed Vs (initial speed V0) is gradually increased (or decreased). Thus, the driving support ECU 10 repeatedly calculates (updates) the deceleration start point Psd1 at predetermined time intervals.

When the vehicle V reaches the deceleration start point Psd1 (when the current position PV matches the deceleration start point Psd1), the driving support ECU 10 decelerates the vehicle V at the acceleration a1.

Figure 5:
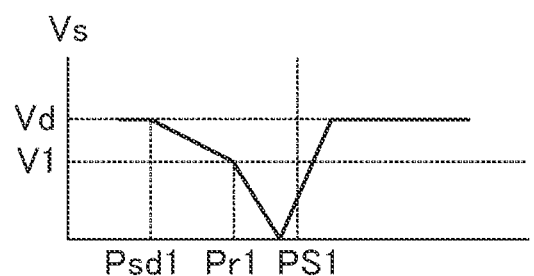
FIG. 5 is a graph for showing a change in a vehicle speed Vs when a signal color of a traffic light S1 is "yellow" or "red" at a recognizable point Pr1.

When the vehicle V reaches the recognizable point Pr1, the driving support ECU 10 acquires the signal color of the traffic light S1 from the camera 53. When the acquired signal color is "yellow" or "red," as shown in FIG. 5, the driving support ECU 10 decelerates the vehicle V at the acceleration a2, and stops the vehicle V before the traffic light S1 (point PS1). As described above, the magnitude (absolute value) of the acceleration a2 is a predetermined value A2 larger than the predetermined value A1. The driving support ECU 10 acquires the signal color of the traffic light S1 from the camera 53 at the predetermined time intervals. When the acquired signal color becomes "green," the driving support ECU 10 accelerates the vehicle V at the acceleration a0 to cause the vehicle V to pass through the traffic light S1, and starts the calculation of the deceleration start point Psd2 corresponding to the traffic light S2. The upper limit value of the vehicle speed Vs at that time is the target value Vd. Further, the magnitude (absolute value) of the acceleration a0 is a predetermined value A0 larger than the predetermined value A1.

Meanwhile, when the signal color acquired at the recognizable point Pr1 is "green," the driving support ECU 10 acquires, from the navigation system 55, a distance DS (see FIG. 2) between the traffic light S1 and the traffic light S2 next in front from the traffic light S1.

<When Distance DS is Relatively Long>

Figure 6:
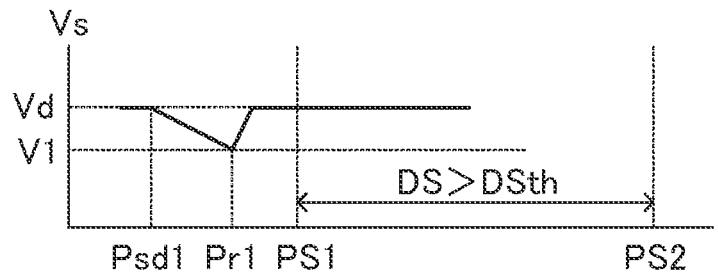
FIG. 6 is a graph for showing a change in the vehicle speed Vs when the signal color of the traffic light S1 is "green" at the recognizable point Pr1 and a distance between the traffic light S1 and a traffic light S2 is relatively long.

When the distance DS is longer than a threshold value DSth, as shown in FIG. 6, the driving support ECU 10 accelerates the vehicle V at the acceleration a0 to cause the vehicle V to pass through the traffic light S1, and starts the calculation of a deceleration start point Psd2. The upper limit value of the vehicle speed Vs at that time is the target value Vd.

<When Distance DS is Relatively Short>

Figure 7:
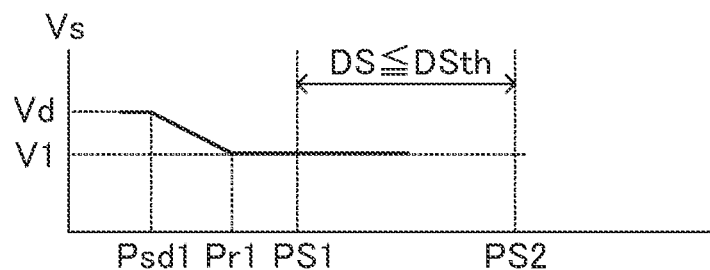
FIG. 7 is a graph for showing a change in the vehicle speed Vs when the signal color of the traffic light S1 is "green" at the recognizable point Pr1 and the distance between the traffic light S1 and the traffic light S2 is relatively short.

When the distance DS is equal to or shorter than the threshold value DSth, as shown in FIG. 7, the driving support ECU 10 stops the acceleration/deceleration of the vehicle V, and causes the vehicle V to travel at a constant speed to pass through the traffic light S1. That is, the vehicle speed Vs at the time at which the vehicles V passes through the traffic light S1 is the vehicle speed Vs at the time at which the vehicle V reaches the recognizable point Pr1 (that is, the target value V1). In this case, when the signal color of the traffic light S2 next in front from the traffic light S1 is "yellow" or "red," the speed is reduced to a speed at which the vehicle V can be safely stopped. Therefore, the driving support ECU 10 is not required to calculate the deceleration start point Psd2 before the traffic light S2. As a result, when the vehicle V passes through the traffic light S1, the driving support ECU 10 attempts to acquire the determination result of the signal color of the traffic light S2 from the camera 53 at predetermined time intervals. Then, when the driving support ECU 10 has successfully acquired the signal color of the traffic light S2, the driving support ECU 10 executes the same control as the control executed when the vehicle V passes through the traffic light S1 in accordance with the acquired signal color.

Figure 8:
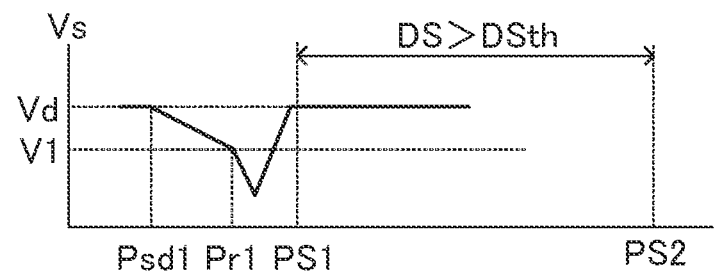
FIG. 8 is a graph for showing a change in the vehicle speed Vs when the signal color of the traffic light S1 is not determinable at the recognizable point Pr1, the signal color successfully determined thereafter is "green," and the distance between the traffic light S1 and the traffic light S2 is relatively long.
Figure 9:
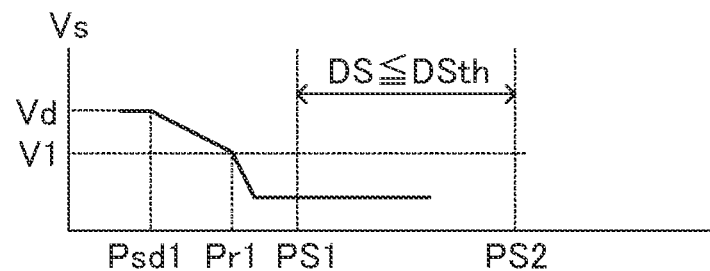
FIG. 9 is a graph for showing a change in the vehicle speed Vs when the signal color of the traffic light S1 is not determinable at the recognizable point Pr1, the signal color successfully determined thereafter is "green," and the distance between the traffic light S1 and the traffic light S2 is relatively short.

Incidentally, there may be a case in which, for example, the road on which the vehicle V is traveling has a large curve immediately before the traffic light S1, and the signal color of the traffic light S1 is not determinable by the camera 53 at the time at which the vehicle V reaches the recognizable point Pr1. In such a case, the driving support ECU 10 tentatively determines that the signal color of the traffic light S1 is "red," and decelerates the vehicle V at the acceleration a2 from the recognizable point Pr1. When the vehicle V advances further, the camera 53 can determine the signal color of the traffic light S1, and the determined signal color is "yellow" or "red," the driving support ECU 10 further decelerates the vehicle V at the acceleration a2, and stops the vehicle V before the traffic light S1. Meanwhile, as shown in FIG. 8, when the camera 53 can determine the signal color of the traffic light S1 and the determined signal color is "green," the driving support ECU 10 acquires the distance DS. When the distance DS is longer than the threshold value DSth, the driving support ECU 10 accelerates the vehicle V at the acceleration a0 to cause the vehicle V to pass through the traffic light S1, and starts the calculation of the deceleration start point Psd2. Meanwhile, when the distance DS is equal to or shorter than the threshold value DSth, as shown in FIG. 9, the driving support ECU 10 stops the deceleration of the vehicle V, and causes the vehicle V to travel at a constant speed to pass through the traffic light S1. That is, the vehicle speed Vs at the time at which the vehicles V passes through the traffic light S1 is lower than the target value V1, which is the speed at the time at which the vehicle V reaches the recognizable point Pr1.

Figure 10A:
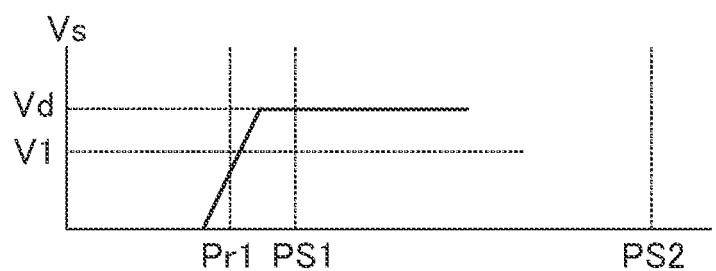
FIG. 10A is a graph for showing a change in the vehicle speed Vs when a vehicle V reaches the recognizable point Pr1 without the vehicle speed Vs exceeding a target value V1, the signal color of the traffic light S1 is "green," and the distance between the traffic lights is relatively long.
Figure 10B:
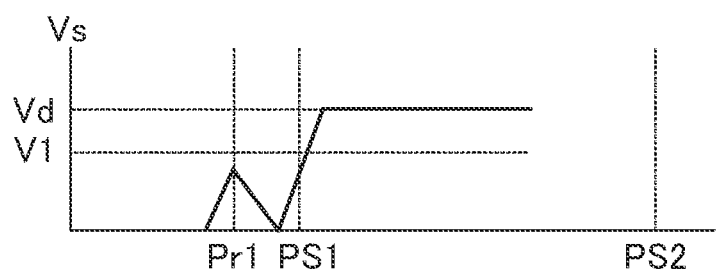
FIG. 10B is a graph for showing a change in the vehicle speed Vs when the vehicle V reaches the recognizable point Pr1 without the vehicle speed Vs exceeding the target value V1 and the signal color of the traffic light S1 is "yellow" or "red."
Figure 10C:
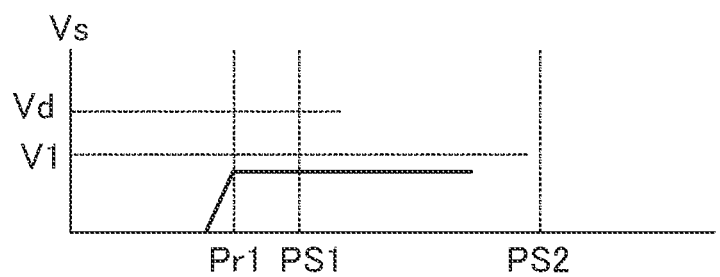
FIG. 10C is a graph for showing a change in the vehicle speed Vs when the vehicle V reaches the recognizable point Pr1 without the vehicle speed Vs exceeding the target value V1, the signal color of the traffic light S1 is "green," and the distance between the traffic lights is relatively short.

Further, as shown in FIG. 10A to FIG. 10C, there may be a case in which the vehicle speed Vs is constantly lower than the target value V1 before the vehicle V reaches the recognizable point Pr1 (for example, when the target value Vd is equal to or higher than the target value V1, but the vehicle V is accelerated from a state in which the vehicle speed Vs is lower than the target value V1 and reaches the recognizable point Pr1 before the target value V1 is reached). In such a case, under the state in which the vehicle speed Vs is equal to or lower than the target value V1, the driving support ECU 10 matches the deceleration start point Psd1 with the recognizable point Pr1 (initializes the deceleration start point Psd1). As a result, deceleration control is not executed until the vehicle V reaches the recognizable point Pr1. In this case, the vehicle speed Vs at the time at which the vehicle V reaches the recognizable point Pr1 is lower than the target value V1, but the subsequent control mode is the same as the control mode executed when the vehicle speed Vs is the target value V1. That is, the driving support ECU 10 accelerates/decelerates the vehicle V in accordance with the signal color of the traffic light S1 and the distance DS (see FIG. 10A, FIG. 10B, or FIG. 10C).

There may be a case in which the vehicle V is quite close to the traffic light S1 when the cruise control start command is received. For example, in the following cases, there is a high likelihood that it is difficult for the driving support ECU 10 to safely control the vehicle V.

When the current position PV is between the recognizable point Pr1 and the point PS1

When the current position PV is before the recognizable point Pr1, but the vehicle speed Vs is a relatively high speed and even when the vehicle is decelerated at the acceleration a1 from the current time, the vehicle speed Vs may not match the target value V1 at the recognizable point Pr1.

In such cases, the driving support ECU 10 notifies the driver that cruise control is not executable, and does not execute the cruise control.

Figure 11:
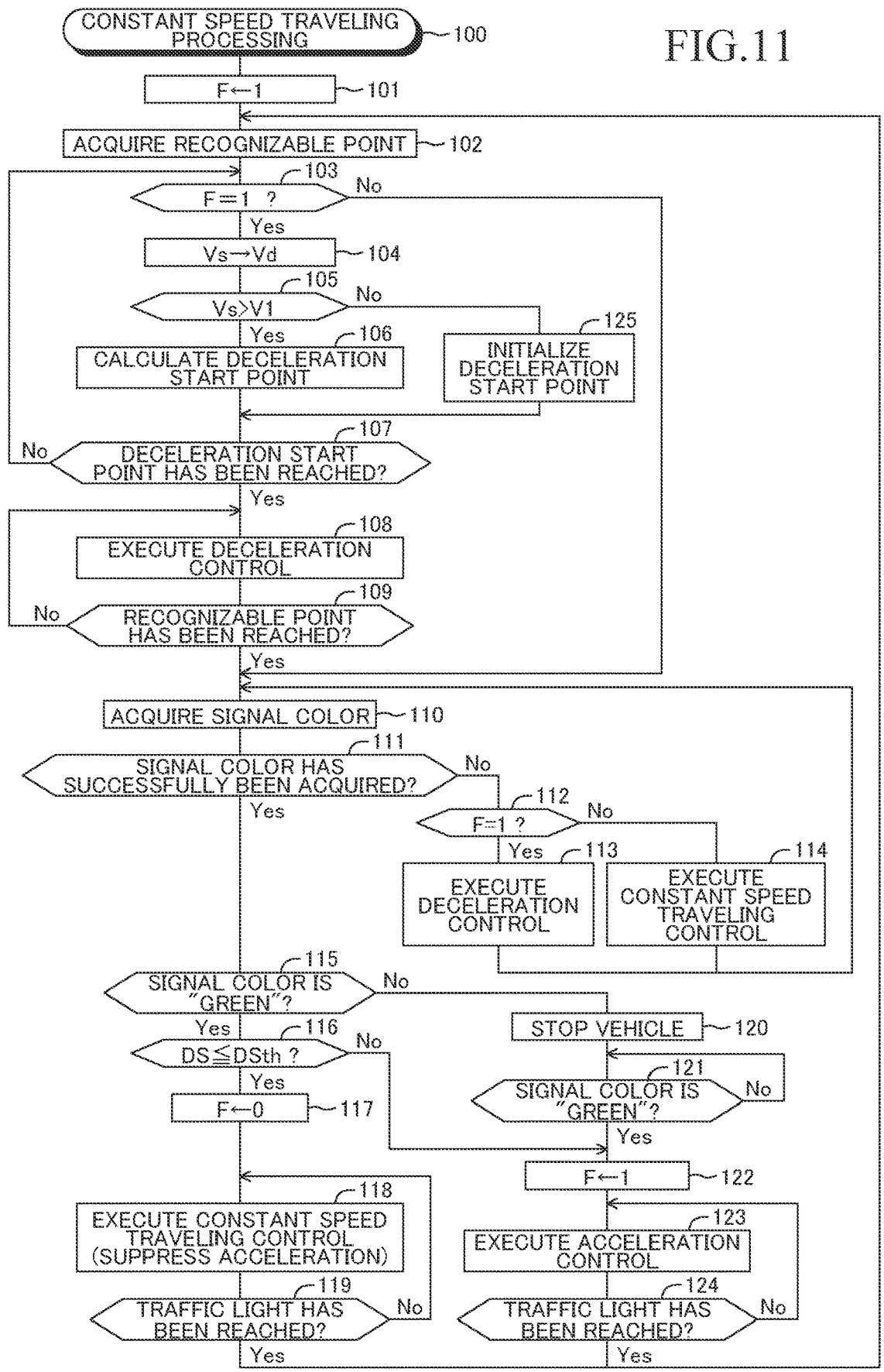
FIG. 11 is a flow chart for illustrating a constant speed traveling program.

Next, with reference to FIG. 11, operation (constant speed traveling program implementing the above-mentioned constant speed traveling control) of the CPU of the driving support ECU 10 (hereinafter simply referred to as "CPU") is specifically described. When there is no preceding vehicle to be followed during a period in which cruise control is being executed, the CPU starts constant speed traveling processing from Step 100. Next, in Step 101, the CPU initializes a flag F to "1" indicating that "acceleration/deceleration is permitted." Then, the CPU advances the process to Step 102.

When the process advances to Step 102, the CPU acquires, from the navigation system 55, the recognizable point Pr (Pr1, Pr2) corresponding to the nearest traffic light S (S1, S2) positioned in front of the vehicle V. Then, the CPU advances the process to Step 103.

When the process advances to Step 103, the CPU determines whether or not the value of the flag F is "1". That is, the CPU determines whether acceleration/deceleration is permitted. When the value of the flag F is "1" ("Yes" in Step 103), the CPU advances the process to Step 104.

When the process advances to Step 104, the CPU controls the drive device and the like such that the vehicle speed Vs matches the target value Vd. Then, the CPU advances the process to Step 105.

When the process advances to Step 105, the CPU determines whether or not the vehicle speed Vs exceeds the target value V1. When the vehicle speed Vs exceeds the target value V1 ("Yes" in Step 105), the CPU advances the process to Step 106.

When the process advances to Step 106, the CPU calculates the deceleration start point Psd (Psd1, Psd2). Then, the CPU advances the process to Step 107.

When the process advances to Step 107, the CPU determines whether or not the vehicle V has reached the deceleration start point Psd (Psd1, Psd2). That is, the CPU determines whether or not the current position PV matches the deceleration start point Psd. When the vehicle V has reached the deceleration start point Psd ("Yes" in Step 107), the CPU advances the process to Step 108.

In Step 107, when the vehicle V has not yet reached the deceleration start point Psd ("No" in Step 107), the CPU returns the process to Step 103.

When the process advances to Step 108, the CPU decelerates the vehicle V at the acceleration a1. Then, the CPU advances the process to Step 109.

When the process advances to Step 109, the CPU determines whether or not the vehicle V has reached the recognizable point Pr. That is, the CPU determines whether or not the current position PV matches the recognizable point Pr. When the vehicle V has reached the recognizable point Pr ("Yes" in Step 109), the CPU advances the process to Step 110. Meanwhile, when the vehicle V has not reached the recognizable point Pr ("No" in Step 109), the CPU returns the process to Step 108.

When the process advances to Step 110, the CPU attempts to acquire the signal color of the traffic light S from the camera 53. Next, in Step 111, the CPU determines whether or not the signal color has successfully been acquired. When the signal color has successfully been acquired ("Yes" in Step 111), the CPU advances the process to Step 115. Meanwhile, when the signal color has not successfully been acquired (for example, when the signal color is not determinable by the camera 53 due to road being curved ("No" in Step 111), the CPU advances the process to Step 112.

When the process advances to Step 112, the CPU determines whether or not the value of the flag F is "1". That is, the CPU determines whether acceleration/deceleration is permitted. When the value of the flag F is "1" ("Yes" in Step 112), in Step 113, the CPU decelerates the vehicle V at the acceleration a2, and then returns the process to Step 110. Meanwhile, when the value of the flag F is "0" ("No" in Step 112), in Step 114, the CPU causes the vehicle V to travel at a constant speed, and returns the process to Step 110.

When the process advances to Step 115, the CPU determines whether or not the acquired signal color is "green." When the signal color is "green" ("Yes" in Step 115), the CPU advances the process to Step 116.

When the process advances to Step 116, the CPU determines whether or not the distance DS between the nearest traffic light S and the traffic light S next in front from the nearest traffic light S is equal to or shorter than the threshold value DSth. When the distance DS is equal to or shorter than the threshold value DSth ("Yes" in Step 116), the CPU advances the process to Step 117.

When the process advances to Step 117, the CPU sets the value of the flag F to "0" indicating that "acceleration and deceleration are prohibited and constant speed traveling is permitted." Next, in Step 118, the CPU causes the vehicle V to travel at a constant speed. Then, the CPU advances the process to Step 119.

When the process advances to Step 119, the CPU determines whether or not the vehicle V has reached the nearest traffic light S. That is, the CPU determines whether or not the current position PV has reached the point PS. When the vehicle V has reached the nearest traffic light S ("Yes" in Step 119), the CPU returns the process to Step 102. Meanwhile, when the vehicle V has not yet reached the nearest traffic light S ("No" in Step 119), the CPU returns the process to Step 118. That is, the CPU causes the vehicle V to travel at a constant speed and waits until the vehicle V reaches the nearest traffic light.

In Step 115, when the signal color is "yellow" or "red," the CPU advances the process to Step 120. When the process advances to Step 120, the CPU decelerates the vehicle V, and stops the vehicle V before the nearest traffic light S. Then, the CPU waits until the signal color of the traffic light S becomes "green." That is, in Step 121, the CPU acquires the signal color of the nearest traffic light S and determines whether or not the signal color is "green." When the signal color is "green" ("Yes" in Step 121), the CPU advances the process to Step 122. Meanwhile, when the signal color is "yellow" or "red," the CPU returns the process to Step 121.

When the process advances to Step 122, the CPU sets the value of the flag F to "1". Then, the CPU advances the process to Step 123.

When the process advances to Step 123, the CPU accelerates the vehicle V at the acceleration a0. Then, the CPU advances the process to Step 124.

When the process advances to Step 124, the CPU determines whether or not the vehicle V has reached the nearest traffic light S. That is, the CPU determines whether or not the current position PV has reached the point PS. When the vehicle V has reached the nearest traffic light S ("Yes" in Step 124), the CPU returns the process to Step 102. Meanwhile, when the vehicle V has not yet reached the nearest traffic light S ("No" in Step 124), the CPU returns the process to Step 123. That is, the CPU accelerates the vehicle V and waits until the vehicle V reaches the nearest traffic light S.

Further, in Step 116, when the distance DS exceeds the threshold value DSth, the CPU advances the process to Step 122.

In Step 103, when the value of the flag F is other than "1" ("No" in Step 103), the CPU advances the process to Step 110.

For example, in the example shown in FIG. 7, the distance DS is equal to or shorter than the threshold value DSth, and hence, when the vehicle V reaches the recognizable point Pr1 ("Yes" in Step 109), the CPU executes Step 110, Step 115, Step 116 to Step 119, and Step 102 to then execute Step 103. In this case, the value of the flag F is set to "0" in Step 117, and hence the CPU advances the process from Step 103 to Step 110.

Further, in Step 105, when the vehicle speed Vs is equal to or lower than the target value V1, in Step 125, the CPU initializes the deceleration start point Psd. That is, the CPU matches the deceleration start point Psd with the recognizable point Pr. Then, the CPU advances the process to Step 107.

For example, in the example shown in FIG. 10A to FIG. 10C, the vehicle speed Vs is lower than the target value V1 before the recognizable point Pr1. Therefore, in this case, the CPU advances the process from Step 105 to Step 125 and to Step 107 in the stated order.

(Effects)

When the signal color of the traffic light S1 is "green" and the distance DS is relatively short (DS<DSth), the driving support ECU 10 of the driving support device 1 according to the at least one embodiment causes the own vehicle V to travel at a constant speed (suppresses acceleration) until the camera 53 recognizes the signal color of the second traffic light S2 next in front from the first traffic light S1. Therefore, it is possible to suppress the repetition of acceleration and deceleration when the interval between the adjacent traffic lights is relatively short. As a result, according to the at least one embodiment, the discomfort of the occupants of the vehicle V can be reduced.

Further, in the above-mentioned related-art device, when the camera has recognized that a traffic light has entered the angle of view (frame) thereof, and the related-art device starts determination of the signal color of the traffic light but the signal color is not determinable, the driving support ECU gradually decelerates the vehicle. Then, when the signal color of the traffic light is determinable by the camera, the driving support ECU accelerates the vehicle, decelerates the vehicle, or causes the vehicle to travel at a constant speed in accordance with the signal color. Accordingly, for example, in a case in which the road has a large curve before the traffic light, when the traffic light enters the angle of view of the camera after the distance between the vehicle and the traffic light becomes relatively short, the driving support ECU decelerates the vehicle at a relatively large acceleration in order to stop the vehicle.

In contrast, the driving support ECU 10 according to the at least one embodiment decelerates the vehicle V from the deceleration start point Psd1 before the recognizable point Pr1 of the vehicle V. That is, the driving support ECU 10 gently decelerates the vehicle V at the acceleration a1 from the deceleration start point Psd1 regardless of whether or not the traffic light S1 is within the angle of view of the camera 53. Therefore, even when the signal color of the traffic light S1 is determinable at the time at which the distance between the own vehicle V and the traffic light S1 has become relatively short, the vehicle speed Vs is relatively low at that time. As a result, even when the signal color of the traffic light S1 is "yellow" or "red" at that time, the driving support ECU can decelerate the vehicle V at a relatively small acceleration a2 (acceleration which does not cause discomfort to the occupants), and can stop the vehicle V before the traffic light S1.

The present invention is not limited to the at least one embodiment described above, and various modification examples can be adopted within the scope of the present invention as described below.

Modification Example

In the example shown in FIG. 9 and FIG. 10C, the driving support ECU 10 causes the vehicle V to travel at a constant speed lower than the target value V1 to pass through the traffic light S1. However, instead of this, the driving support ECU 10 may accelerate the vehicle V at an acceleration a0 (or an acceleration smaller than acceleration a0) from the time at which the signal color of the traffic light S1 is determined to be "green" to match the vehicle speed Vs with the target value V1, and then cause the vehicle V to travel at a constant speed until the camera 53 determines the signal color of the traffic light S2.

The vehicle V may be an autonomous vehicle.

What is claimed is:

1. A driving support device which is mounted on an own vehicle, the driving support device comprising:
   a memory storing one or more instructions; and
   a processor operatively connected to the memory and configured to execute the one or more instructions stored in the memory, wherein the one or more instructions, when executed by the processor, cause the driving support device to:
   control a drive device and a braking device of the own vehicle such that a speed of the own vehicle matches a predetermined first target value when another vehicle is not present in front of the own vehicle;
   recognize a signal color of a traffic light present in a predetermined area extending in front from the own vehicle;
   detect a position of the own vehicle and a position of the traffic light,
   wherein the signal color of the traffic light is recognizable when a distance to the traffic light positioned in front of the own vehicle is equal to or shorter than a first predetermined value;
   control the drive device and the braking device of the own vehicle before a first point such that a speed of the own vehicle at a time at which the own vehicle reaches the first point is equal to or lower than a second target value which is a lower speed than the predetermined first target value, the first point being a point at which a distance to a first traffic light, which is the nearest traffic light positioned in front of the own vehicle, is the first predetermined value; and
   control the drive device and the braking device such that, when a signal color of the first traffic light that is recognized is green, and a distance between the first traffic light and a second traffic light that is positioned ahead of the first traffic light is equal to or shorter than a predetermined threshold value, wherein the second traffic light is further away from the own vehicle than the first traffic light, the own vehicle travels at a constant speed equal to or lower than the second target value until a signal color of the second traffic light is recognized.

2. The driving support device according to claim 1, wherein the one or more instructions, when executed by the processor, further cause the driving support apparatus to decelerate the own vehicle at a predetermined acceleration from a predetermined point before the first point such that the speed of the own vehicle at the time at which the own vehicle reaches the first point matches the second target value.

3. The driving support device according to claim 2, wherein the one or more instructions, when executed by the processor, further cause the driving support apparatus to calculate a distance for which the own vehicle travels until a vehicle speed matches the second target value when the own vehicle decelerates from a current vehicle speed at the predetermined acceleration, and to determine a point positioned before the first point by the calculated distance as the predetermined point.

4. The driving support device according to claim 2, wherein the predetermined acceleration has a magnitude of 0.1 g or less, where g is the gravitational acceleration.

5. A driving support method to be applied to a driving support device mounted on an own vehicle, the driving support method comprising:
    a speed control step of controlling a drive device and a braking device of the own vehicle such that a speed of the own vehicle matches a predetermined first target value when another vehicle is not present in front of the own vehicle;
    a signal color recognition step of recognizing a signal color of a traffic light present in a predetermined area extending in front from the own vehicle; and
    a position detection step of detecting a position of the own vehicle and a position of the traffic light,
    wherein the signal color recognition step is executed when a distance between the traffic light positioned in front of the own vehicle and the own vehicle is equal to or shorter than a first predetermined value,
    wherein the speed control step includes:
        controlling the drive device and the braking device of the own vehicle before a first point such that a speed of the own vehicle at a time at which the own vehicle reaches the first point is equal to or lower than a second target value which is a lower speed than the predetermined first target value, the first point being a point at which a distance to a first traffic light, which is the nearest traffic light positioned in front of the own vehicle, is the first predetermined value; and
        controlling the drive device and the braking device such that, when a signal color of the first traffic light that is recognized is green, and a distance between the first traffic light and a second traffic light that is positioned ahead of the first traffic light is equal to or shorter than a predetermined threshold value, wherein the second traffic light is further away from the own vehicle than the first traffic light, the own vehicle travels at a constant speed equal to or lower than the second target value until a signal color of the second traffic light is recognized in the signal color recognition step.

6. A non-transitory computer-readable storage medium storing a driving support program to be applied to a computer of a driving support device mounted on an own vehicle, the driving support program causing the computer to execute:
    a speed control step of controlling a drive device and a braking device of the own vehicle such that a speed of the own vehicle matches a predetermined first target value when another vehicle is not present in front of the own vehicle;
    a signal color recognition step of recognizing a signal color of a traffic light present in a predetermined area extending in front from the own vehicle; and
    a position detection step of detecting a position of the own vehicle and a position of the traffic light,
    wherein the signal color recognition step is executed when a distance between the traffic light positioned in front of the own vehicle and the own vehicle is equal to or shorter than a first predetermined value,
    wherein the speed control step includes:
        controlling the drive device and the braking device of the own vehicle before a first point such that a speed of the own vehicle at a time at which the own vehicle reaches the first point is equal to or lower than a second target value which is a lower speed than the predetermined first target value, the first point being a point at which a distance to a first traffic light, which is the nearest traffic light positioned in front of the own vehicle, is the first predetermined value; and
        controlling the drive device and the braking device such that, when a signal color of the first traffic light that is recognized is green, and a distance between the first traffic light and a second traffic light that is positioned ahead of the first traffic light is equal to or shorter than a predetermined threshold value, wherein the second traffic light is further away from the own vehicle than the first traffic light, the own vehicle travels at a constant speed equal to or lower than the second target value until a signal color of the second traffic light is recognized in the signal color recognition step.

* * * * *